Nov. 19, 1940. A. N. NILSON 2,221,812
ELECTRIC MOTOR
Filed Jan. 7, 1935
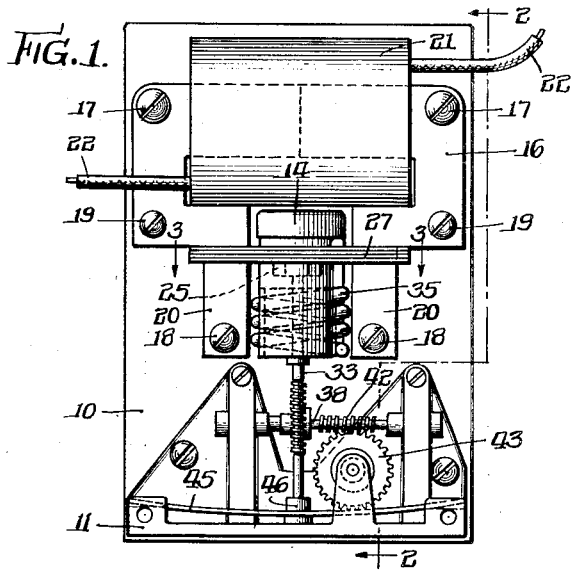
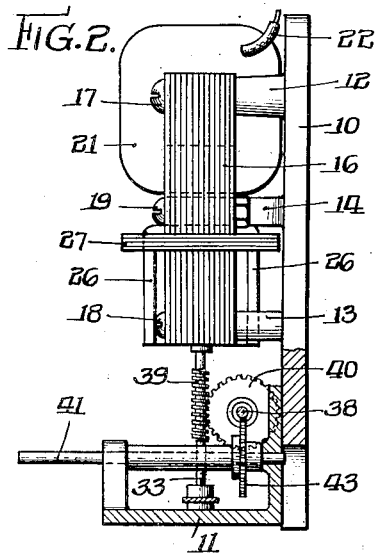
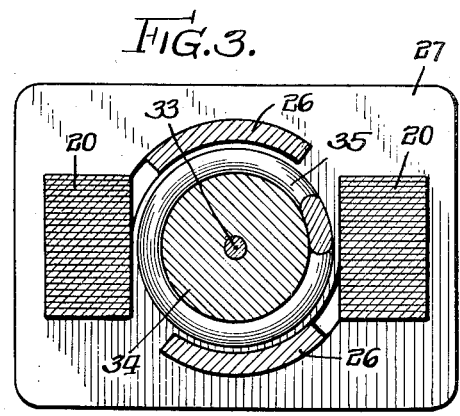
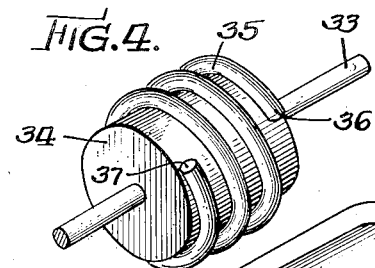
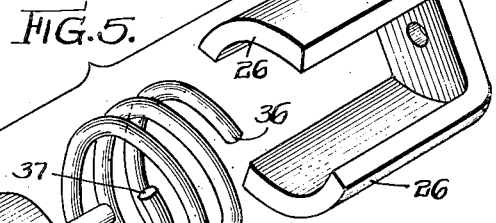
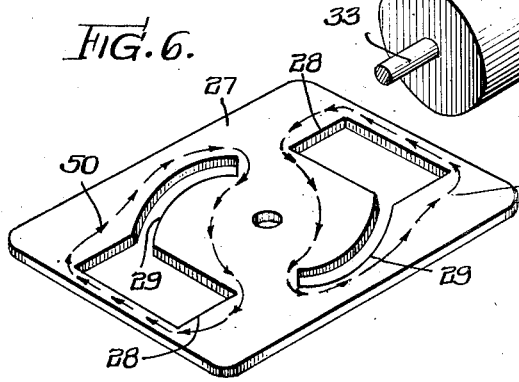
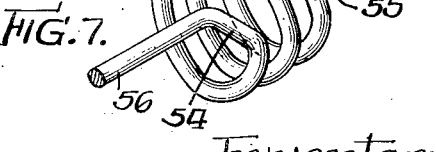
Inventor:
Arthur N. Nilson
By:- Cox & Moore attys Patented Nov. 19, 1940

2,221,812

UNITED STATES PATENT OFFICE 2,221,812

ELECTRIC MOTOR

Arthur N. Nilson, Chicago, Ill., assignor to June R. Farquharson, Chicago, Ill.

Application January 7, 1935, Serial No. 586

21 Claims. (Cl. 172—275)

This invention relates to electric motors and particularly to alternating current motors of the self-starting, synchronously running type.

It is an object of the invention to provide an efficient and reliable electric motor which may be readily and economically constructed of a minimum number of parts, and in which the arrangement of the parts is such that the unit is small and compact, thereby adapting it for use in installations where space and economy are important considerations.

It is a further object of the invention to provide a new, improved, and simplified rotor for an alternating current electric motor which when placed in a rotating field will be both self-starting and synchronously operating. The rotor comprises merely a helically or spirally formed metallic rib or wire which may be readily constructed and assembled, and which is efficient and possesses both self-starting and synchronously operating characteristics.

It is a still further object of the invention to provide in an alternating current electric motor a new and improved means for producing a rotating field, and a means which will produce such field with single phase alternating current. In accordance with the invention such means comprises a perforated conductnig plate embracing primary and secondary magnetic poles, forming therebetween a new and simplified inductor coupling.

Other objects and advantages of the invention will appear from the following description when taken in connection with the accompanying drawing, wherein there is set forth certain preferred embodiments of the invention.

In the drawing wherein like reference numerals refer to like parts throughout:

Fig. 1 is a side elevational view, slightly enlarged, of a motor incorporating the features of the invention.

Fig. 2 is an end elevation, partly in section, of the motor of Fig. 1, taken along the line 2—2 thereof.

Fig. 3 is a sectional view, further enlarged, taken along the line 3—3 of Fig. 1.

Fig. 4 is a perspective view of one form of rotor assembly, also further enlarged.

Fig. 5 is an extended view of the rotor unit of Fig. 4 and the member which forms the secondary field poles, illustrating the method of assembling these parts.

Fig. 6 is an enlarged perspective view of one of the inductor coupling plates, and Fig. 7 is a perspective view of a modified form of rotor.

Referring now to the drawing, and particularly to Figs. 1 to 6 thereof, it will be seen that the motor shown for purposes of illustration comprises a back plate 10, having a base plate 11 rigidly secured thereto, said backing and base forming the motor frame. Formed integral with the back plate 10 are two pairs of lugs 12 and 13, and a single larger projection 14, located approximately centrally of the back plate. An iron core 16, which may consist of a plurality of laminated plates separable at 16', is suitably secured to the lugs 12 and 13 by means of screws 17 and 18, respectively. The laminated plates in the core are further secured together by nuts and bolts 19. The core is preferably of general U-shape, as shown, and terminates at its lower end in spaced apart depending pole pieces 20, which form the primary field poles. Mounted upon the upper horizontal transverse part of the core is a coil 21 to which current may be supplied by electric leads 22.

A bushing is press fitted through the projection 14 near the outer end thereof, and threaded to the lower end of the bushing is a nut 25. The nut clamps in position between itself and the projection 14, a U-shaped member of magnetic material and preferably of soft steel which terminates in a pair of depending spaced projections 26 which form the secondary field poles, and a plurality of copper plates 27, arranged in superimposed and aligned relation. As best shown in Figs. 3 and 6, the plates 27 have square openings 28 through which the depending primary field poles 20 project, and connected arcuate openings 29 through which the secondary field poles 26 of the U-shaped member project. The plates 27 constitute an inductor coupling between the primary and secondary poles.

As shown, the secondary pole pieces 26 are displaced not quite 90° from the primary pole pieces 20, as best results are secured with this positioning of the parts. However, the two sets of poles may be displaced a full 90°, the construction being operative over a considerable range of displacement.

The plates 27 while preferably of copper may be of any conducting material, and a single plate rather than a plurality of plates could be used if desired.

In assembling the parts previously described, the U-shaped secondary pole piece member and the inductor coupling plates 27 are first secured in position upon the projection 14 by means of nut 25. The depending ends 20 of the core 16, to which the coil 21 has been affixed, may then be slipped through the plates 27 into position and the core is thereafter secured in position upon the backing plate by means of screws 17 and 18.

Journalled at its upper end in the bushing fitted into projection 14, and at its lower end in a cup bearing 46 secured to and carried by leaf spring 45, is a rotor shaft 33, which has fixed thereon near its upper end and between the field poles, a block 34. Embracing the block, as best shown in Fig. 4, is a hardened steel wire 35, having its ends 36 and 37 in aligned relation axially of the block. The block is preferably cylindrical and the wire of helical formation, as shown. The block may be formed of wood, Bakelite, hard fibre or other suitable non-conducting and non-magnetic material, or it may be formed of hardened steel. The helical steel wire 35 tightly embraces the cylindrical block so that it will not slip thereon forming a compact, simple and efficient rotor unit.

The rotor shaft 33 drives a cross shaft 38 by means of threads 39 cut thereon, which engage a gear 40 secured upon the cross shaft. The cross shaft 38 in turn drives the power or drive shaft 41, by means of its threaded engagement at 42, with a gear 43 secured to the power shaft 41. The light leaf spring 45 bears upwardly against the bearing 46, thus urging the rotor shaft 33 yieldingly upward to take out end play in the shaft.

In operation, as alternating current is applied to coil 21, primary field poles 20 are alternately magnetized. The conducting plates 27, by virtue of their positioning and by virtue of the openings 28 and 29 cut therein, act substantially as would two coils of wire, each embracing respectively one of the primary field poles 20 and one of the secondary field poles 26. This action is illustrated in Fig. 6, wherein arrows 50 indicate the conducting paths within the plates. It will be seen that these paths are the equivalent of coils of wire embracing each set of primary and secondary field poles. By means of the conducting plates 27 an induced magnetic field is set up in the secondary field poles 26. However, due to the impedance of the plates 27 and so-called transformer effect, the field in the secondary poles lags that in the primary poles, thereby producing a rotating field even though only a single phase alternating current is applied to coil 21, in a manner well understood in the art.

The rotor element 35 possesses in such rotating magnetic field both self-starting and synchronously operating characteristics. Due to the continuous formation of the element, it possesses self-starting characteristics and the terminating portions 36 and 37 of the element, together with the reluctance of the air gaps formed, prevent the salient magnetic poles induced in the rotor from crawling or slipping along the element. The rotor element is therefore synchronously operating as well as self-starting. It will be noted that the ends 36 and 37 are in aligned relation axially of the rotor shaft. Corresponding salient poles are produced in aligned relation axially of the shaft on each turn of the helix along one side of the rotor and a plurality of poles of opposite polarity are formed in aligned relation upon the helix turns diametrically across the block 34. These salient poles remain fixed during operation of the rotor and are prevented from slipping by the helix ends, thereby producing synchronous operation. As previously stated, the element 35 is of hardened steel, and the cylindrical block 34, which forms merely the support for the helical element may be wood or fibre, or other like non-magnetic material, or of hardened steel.

In Fig. 7 is shown a modified form of rotor element by means of which the necessity for the mechanical supporting block 34 is dispensed with. In this form of the invention the steel wire element has a helical portion 53 terminating at each end in radially arranged portions 54 and 55 in aligned relation axially of the helix body, which in turn are bent to form co-axial portions 56—57. The portions 56 and 57 are co-axial and pass through the center of the helical body portion and form the shaft and axis of rotation for the element. The action of the rotor in this form of the invention is substantially the same as that previously described in connection with Figs. 1 to 6 inclusive. The rotor is both self-starting and synchronously operating, the salient poles being prevented from slipping off the ends of the helical turns by the shaping of the element.

It will be seen that by the invention there is produced a self-starting synchronously operating motor which is compactly arranged and which may be readily constructed and assembled of a minimum of parts. The plates 27 constitute a simplified construction in that they may be easily stamped and readily assembled into position, and yet they act as effective inductor couplings for electrically connecting the primary and secondary field poles. The rotor element is very easily made as it comprises merely a helically formed steel wire, and it may be as easily assembled into position. Yet, the rotor is efficient and possesses desirable self-starting and synchronously operating characteristics.

It is to be understood that a number of changes may be made in the embodiments of the invention used for purposes of illustration without departing from the spirit of the invention. For example, the rotor element could be spirally formed of varying numbers of turns. The invention contemplates the use of equivalents throughout and, accordingly, I do not wish my invention to be limited to the precise embodiments shown and described but only as indicated in the following claims.

I claim:

1. A rotor assembly for alternating current motors, comprising a block of non-conducting material, and a synchronizing portion consisting of a spirally arranged element of conducting material embracing said block, the loops of said spirally arranged element being substantially coaxial.

2. A self-starting, synchronously running rotor assembly for alternating current motors comprising a cylindrical block of hardened steel and a synchronizing portion consisting of a helically formed steel wire embracing said block, the loops of said helically formed wire being substantially coaxial.

3. A rotor element for alternating current motors comprising a wire of magnetic material, said wire having a spirally formed body portion terminating at each end in substantially co-axial projections arranged centrally and axially of the body portion to form the rotor axis.

4. An alternating current electric motor having a self-starting, synchronously operating rotor comprising a hardened steel wire spirally arranged, and having its ends in the same radial plane, the spirally arranged loops of the wire being coaxial and out of contact.

5. A self-starting, synchronously running, alternating current motor, comprising a rotor formed of a spirally arranged rib of magnetic material, primary and secondary poles arranged in quadrature around the axis of the rotor, and an inductor coupling of electrically conducting material connecting said primary and secondary poles, the spiral loops of said rib being substantially coaxial.

6. A self-starting, synchronously operating alternating current motor, comprising a rotor formed of a spirally arranged wire of magnetic material, the ends of said wire being in the same radial plane, primary and secondary magnetic poles arranged in quadrature around the axis of the rotor, and an inductor coupling electrically connecting said primary and secondary poles, said coupling comprising a plate of conducting material having an opening therein through which a primary pole passes, and an opening contiguous with the first opening through which the secondary pole passes.

7. An electric motor having primary and secondary poles, and an inductor coupling electrically connecting said poles, said coupling comprising a plate of conducting material having an opening through which a primary pole passes and an opening contiguous and connecting with said first named opening through which a secondary pole passes.

8. An inductor coupling for electrically connecting the primary and secondary poles of an electric motor, comprising a plurality of superimposed plates of conducting material having aligned pairs of openings through which the primary poles may be passed, each of said openings having a contiguous and connecting extension through which a secondary pole may be passed.

9. An electric motor, comprising a rotor, said rotor being formed of a spirally arranged hardened steel wire having its ends in the same radial plane, primary and secondary field poles arranged around the axis of the rotor, and a plate of conducting material through which all of said pole pieces pass, the spiral loops of said wire being out of contact and substantially coaxial.

10. An electric motor comprising a rotor, said rotor being formed of a helically arranged hardened steel wire, having its ends in the same radial plane, primary and secondary field poles arranged in quadrature around the axis of the rotor, a plurality of superimposed plates of conducting material having openings through which all of said poles pass, said primary pole pieces being formed from a U-shaped core having mounted thereon an electric coil, and said secondary pole pieces being formed from a U-shaped member.

11. An electric motor comprising a vertically disposed backing plate having a projection secured thereto, a U-shaped core secured to said backing member, said core terminating in a pair of spaced downwardly extending primary pole pieces, an electric coil embracing a portion of said core, a U-shaped member of magnetic material secured to said projection terminating in a pair of spaced and downwardly extending secondary pole pieces arranged in quadrature with respect to said primary pole pieces, a plate of conducting material secured to said projection and having openings extending therethrough through which all of said pole pieces project, and a vertically disposed rotor shaft journalled in said projection and arranged between the primary and secondary pole pieces, said shaft having mounted thereon a rotor element comprising a helically arranged, hardened steel wire.

12. An electric motor comprising a vertically disposed backing plate having a base supporting plate secured thereto, a core of magnetic material secured to said backing plate, said core terminating in a pair of spaced downwardly extending primary pole pieces, a coil embracing a portion of said core, a U-shaped member terminating in a pair of spaced and downwardly extending secondary pole pieces arranged in quadrature with respect to said primary pole pieces, a horizontally disposed plate of conducting material having openings through all of which said pole pieces pass, and a vertically disposed rotor shaft having a rotor element arranged between the primary and secondary pole pieces.

13. A rotor for electric motors comprising a helically formed, hardened steel wire having its opposite ends arranged in alignment axially of the helix.

14. A rotor element for alternating current motors, said rotor having a synchronizing portion consisting of a rib of magnetic material formed into a plurality of substantially co-axial loops, said loops being out of contact and being stationary with respect to each other during the operative functioning of the rotor.

15. A rotor for electric motors, said rotor having a synchronizing portion consisting of a spirally formed rib of conducting material, said rib being substantially unyielding during the operative functioning of the rotor and the loops of said rib being substantilly coaxial.

16. A rotor for electric motors, said rotor having a synchronizing portion consisting of a helically formed, hardened steel wire, said wire being substantially unyielding during the operative functioning of the rotor and the loops of said wire being substantially coaxial.

17. A motor comprising primary and secondary poles, and an inductor coupling for electrically connecting the primary and secondary poles, said inductor coupling comprising a plate of conducting material having a pair of openings formed therethrough, each of said openings having primary and secondary pole pieces arranged therein.

18. A rotor element for alternating current motors comprising a rib of magnetic material formed into a plurality of substantially coaxial loops, the ends of said rib lying in the same radial plane.

19. A rotor assembly for alternating current motors comprising a block of non-conducting material, and a spirally arranged element of conducting material embracing said block, the ends of said element lying in the same radial plane and the spiral loops of the element being substantially coaxial.

20. A rotor element for alternating current motors comprising a wire of magnetic material, said wire having a spirally formed body portion terminating at one end in a substantially coaxial projection arranged centrally and axially of the body portion to form the rotor axis.

21. An alternating current electric motor having a self-starting synchronously operating rotor comprising a conducting metallic rib spirally arranged, and having its ends in the same radial plane, the spiral loops of the rib being out of contact.

ARTHUR N. NILSON.